US010851795B2

(12) United States Patent
Lin et al.

(10) Patent No.: US 10,851,795 B2
(45) Date of Patent: Dec. 1, 2020

(54) MULTIFUNCTIONAL AIR PUMP

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing, Ltd., Tortola (VG)

( * ) Notice: Subject to any disclaimer, the term of this patent is extended or adjusted under 35 U.S.C. 154(b) by 296 days.

(21) Appl. No.: 15/768,436

(22) PCT Filed: Oct. 14, 2016

(86) PCT No.: PCT/IB2016/001484
§ 371 (c)(1),
(2) Date: Apr. 13, 2018

(87) PCT Pub. No.: WO2017/064553
PCT Pub. Date: Apr. 20, 2017

(65) Prior Publication Data
US 2018/0335042 A1    Nov. 22, 2018

(30) Foreign Application Priority Data

Oct. 16, 2015   (CN) .......................... 2015 2 0799262
Nov. 12, 2015   (CN) .......................... 2015 2 0898479
(Continued)

(51) Int. Cl.
*F04D 27/00*   (2006.01)
*F04D 25/08*   (2006.01)
*F04D 29/056*  (2006.01)

(52) U.S. Cl.
CPC ........... *F04D 27/004* (2013.01); *F04D 25/08* (2013.01); *F04D 25/084* (2013.01);
(Continued)

(58) Field of Classification Search
CPC .......... F04D 25/00; F04D 25/02; F04D 25/06; F04D 25/08; F04D 25/084; F04D 25/12;
(Continued)

(56) References Cited

U.S. PATENT DOCUMENTS

| 38,837 A | 8/1888 | Hargin |
| 2,926,836 A | 3/1960 | Marsh et al. |

(Continued)

FOREIGN PATENT DOCUMENTS

| CN | 2611641 Y | 4/2004 |
| CN | 1260478 C | 8/2004 |

(Continued)

OTHER PUBLICATIONS

Supplemental European Search Report in EP16855009 dated May 13, 2019, 9 pages.
(Continued)

*Primary Examiner* — Patrick Hamo
*Assistant Examiner* — Chirag Jariwala
(74) *Attorney, Agent, or Firm* — Faegre Drinker Biddle & Reath LLP

(57) ABSTRACT

A multifunctional air pump is disclosed including an air pump assembly, a control module, and a remote user input for inflating and deflating an inflatable product. The air pump may be operated remotely for convenience. The air pump may also operate automatically to maintain the pressure of the inflatable product.

22 Claims, 18 Drawing Sheets

(30) Foreign Application Priority Data

| Nov. 27, 2015 | (CN) | .......................... 2015 2 0959301 |
| Mar. 29, 2016 | (CN) | .......................... 2016 2 0247404 |
| May 18, 2016 | (CN) | .......................... 2016 1 0329403 |
| May 18, 2016 | (CN) | .......................... 2016 2 0452516 |
| May 18, 2016 | (CN) | .......................... 2016 2 0452544 |
| May 18, 2016 | (CN) | .......................... 2016 2 0452545 |
| May 18, 2016 | (CN) | .......................... 2016 2 0452597 |

(52) U.S. Cl.
CPC ......... *F04D 27/001* (2013.01); *F04D 27/008* (2013.01); *F04D 29/056* (2013.01)

(58) Field of Classification Search
CPC .... F04D 27/001; F04D 27/004; F04D 27/008; F04D 29/4246; F04D 29/056; H02K 9/00; H02K 9/02; H02K 9/04; H02K 9/06
USPC ........ 417/44.1, 44.2, 44.11, 280, 315, 410.1, 417/423.1, 423.7; 137/224, 565.01, 137/565.16, 602, 605, 861
See application file for complete search history.

(56) References Cited

U.S. PATENT DOCUMENTS

| 3,155,991 | A | 11/1964 | Dunham |
| 4,504,989 | A | 3/1985 | Maltz |
| 4,619,481 | A | 10/1986 | Grudzinskas |
| 4,638,519 | A | 1/1987 | Hess |
| 4,711,275 | A | 12/1987 | Ford et al. |
| 4,768,249 | A | 9/1988 | Goodwin |
| 4,829,616 | A | 5/1989 | Walker |
| 4,890,344 | A | 1/1990 | Walker |
| 4,897,890 | A | 2/1990 | Walker |
| 4,944,060 | A | 7/1990 | Peery et al. |
| 5,020,176 | A | 6/1991 | Dotson |
| 5,044,029 | A | 9/1991 | Vrzalik |
| 5,142,717 | A | 9/1992 | Everard et al. |
| 5,235,713 | A | 8/1993 | Guthrie et al. |
| 5,249,319 | A | 10/1993 | Higgs |
| 5,349,983 | A | 9/1994 | Ozarowski et al. |
| 5,367,726 | A | 11/1994 | Chaffee |
| 5,509,154 | A | 4/1996 | Shafer et al. |
| 5,588,811 | A | 12/1996 | Price |
| 5,652,484 | A | 7/1997 | Shafer et al. |
| 5,711,041 | A | 1/1998 | Chen |
| 5,716,199 | A | 2/1998 | Shan-Chieh |
| 5,903,941 | A | 5/1999 | Shafer et al. |
| 5,904,172 | A | 5/1999 | Gifft et al. |
| 5,944,494 | A | 8/1999 | Soltani et al. |
| 6,032,080 | A | 2/2000 | Brisbane et al. |
| 6,037,723 | A | 3/2000 | Shafer et al. |
| 6,058,537 | A | 5/2000 | Larson |
| 6,158,082 | A | 12/2000 | Beckey et al. |
| 6,206,654 | B1 | 3/2001 | Cassidy |
| 6,212,718 | B1 | 4/2001 | Stolpmann et al. |
| 6,253,401 | B1 | 7/2001 | Boyd |
| 6,483,264 | B1 | 11/2002 | Shafer et al. |
| 6,623,249 | B1* | 9/2003 | Rogers .................... F04B 41/06 417/201 |
| 6,686,711 | B2 | 2/2004 | Rose et al. |
| 6,698,046 | B1 | 3/2004 | Wu |
| 6,755,208 | B2 | 6/2004 | Chaffee |
| 6,763,541 | B2 | 7/2004 | Mahoney et al. |
| 6,928,681 | B1 | 8/2005 | Stacy |
| 7,036,171 | B2 | 5/2006 | Wu |
| 7,141,101 | B2 | 11/2006 | Amann |
| 7,225,488 | B2 | 6/2007 | Wu |
| 7,322,801 | B2 | 1/2008 | Wenjun et al. |
| 7,346,944 | B2 | 3/2008 | Shaw |
| 7,434,283 | B2 | 10/2008 | Wilkinson et al. |
| 7,444,704 | B2 | 11/2008 | Phillips et al. |
| 7,648,392 | B2 | 1/2010 | Chambers et al. |
| 7,784,132 | B2 | 8/2010 | Gonzalez et al. |
| 7,789,194 | B2 | 9/2010 | Lathrop et al. |
| 7,805,785 | B2 | 10/2010 | Rawls-Meehan |
| 7,979,169 | B2 | 7/2011 | Rawls-Meehan |
| 8,024,830 | B2* | 9/2011 | Wang .................... A47C 27/082 5/713 |
| 8,032,263 | B2 | 10/2011 | Rawls-Meehan |
| 8,032,960 | B2 | 10/2011 | Rawls-Meehan |
| 8,046,117 | B2 | 10/2011 | Rawls-Meehan |
| 7,877,829 | B2 | 12/2011 | Phillips et al. |
| 8,078,336 | B2 | 12/2011 | Rawls-Meehan |
| 8,078,337 | B2 | 12/2011 | Rawls-Meehan |
| 8,125,318 | B2 | 2/2012 | Heimbrock |
| 8,162,009 | B2 | 4/2012 | Chaffee |
| 8,336,369 | B2 | 12/2012 | Mahoney |
| 8,413,278 | B2 | 4/2013 | Chaffee |
| 8,561,230 | B2 | 10/2013 | Shaw |
| 8,656,539 | B1 | 2/2014 | Boyd |
| 8,678,007 | B2 | 3/2014 | Porter |
| 8,682,457 | B2 | 3/2014 | Rawls-Meehan |
| 8,745,796 | B2 | 6/2014 | Liu |
| 8,769,747 | B2 | 7/2014 | Mahoney et al. |
| 8,801,392 | B2 | 8/2014 | Wang et al. |
| 8,832,886 | B2 | 9/2014 | Riley et al. |
| 8,839,473 | B1 | 9/2014 | Catala |
| 8,839,474 | B2 | 9/2014 | Chaffee |
| 8,863,771 | B2 | 10/2014 | Wang et al. |
| 8,893,339 | B2 | 11/2014 | Fleury et al. |
| 8,931,329 | B2 | 1/2015 | Mahoney |
| 9,211,018 | B2 | 12/2015 | Wang |
| 9,211,019 | B2 | 12/2015 | Driscoll et al. |
| 9,279,510 | B2 | 3/2016 | Chaffee |
| 9,289,073 | B2 | 3/2016 | Chaffee |
| 9,295,336 | B2 | 3/2016 | Driscoll, Jr. et al. |
| 9,314,105 | B2 | 4/2016 | Rawls-Meehan |
| 9,729,430 | B2 | 8/2017 | Weinstein |
| 9,879,682 | B1* | 1/2018 | Beliveau ................. F04D 17/16 |
| 2011/0073202 | A1 | 3/2011 | Feingold et al. |
| 2011/0259449 | A1 | 10/2011 | Wang et al. |
| 2011/0284108 | A1 | 11/2011 | Wang et al. |
| 2012/0304391 | A1 | 12/2012 | Driscoll et al. |
| 2013/0134764 | A1 | 5/2013 | Groh |
| 2013/0230410 | A1 | 9/2013 | Tsai |
| 2014/0188285 | A1 | 7/2014 | Rawls-Meehan |
| 2014/0250597 | A1 | 9/2014 | Chen et al. |
| 2014/0259434 | A1 | 9/2014 | Nunn et al. |
| 2014/0277611 | A1 | 9/2014 | Nunn et al. |
| 2015/0026896 | A1 | 1/2015 | Fleury et al. |
| 2015/0082547 | A1 | 3/2015 | Boyd |
| 2015/0082548 | A1 | 3/2015 | Boyd |
| 2015/0135444 | A1* | 5/2015 | Spahn .................. A47C 27/083 5/655.3 |
| 2015/0157137 | A1 | 6/2015 | Nunn et al. |
| 2015/0164236 | A1 | 6/2015 | Driscoll, Jr. et al. |
| 2015/0182033 | A1 | 7/2015 | Brosnan et al. |
| 2015/0374137 | A1 | 12/2015 | Mahoney et al. |
| 2017/0130728 | A1* | 5/2017 | Liu ........................ F04D 25/084 |
| 2017/0202364 | A1* | 7/2017 | Ohno ..................... A47C 27/10 |
| 2017/0280884 | A1 | 10/2017 | Liu |

FOREIGN PATENT DOCUMENTS

| CN | 2746161 | 12/2005 |
| CN | 2750081 | 1/2006 |
| CN | 201090463 | 7/2008 |
| CN | 201091399 | 7/2008 |
| CN | 201273290 | 7/2009 |
| CN | 201347870 Y | 11/2009 |
| CN | 105283098 A | 1/2016 |
| CN | 205064308 U | 3/2016 |
| CN | 105952663 A | 9/2016 |
| CN | 205744550 U | 11/2016 |
| JP | H0754781 | 2/1995 |
| JP | 2013-127206 A | 6/2013 |

(56) References Cited

FOREIGN PATENT DOCUMENTS

| JP | 5929157 | 6/2013 |
|----|---------|--------|
| WO | 02/15835 | 2/2002 |

OTHER PUBLICATIONS

Written Opinion of the International Searching Authority in International Application No. PCT/IB2016/001484, dated Feb. 23, 2017, 6 pages.
International Preliminary Report on Patentability received for PCT Patent Application No. PCT/IB2016/001484, dated Apr. 26, 2018, 7 pages.
International Search Report and Written Opinion received for PCT Patent Application No. PCT/IB2016/001484, dated Feb. 23, 2017, 8 pages.
Yingyi Motor, Micro Air Pump (2004), 4 pages, www.yingyimotor.com/product/60423125783-801366169/Micro_Air_Pump_YYP370_XB2_DC3V_6V_9V_12V_24V.html, Nov. 12, 2019.

* cited by examiner

MULTIFUNCTIONAL AIR PUMP

CROSS REFERENCE TO RELATED APPLICATIONS

This application is a U.S. National Stage Application of International Patent Application No. PCT/IB2016/001484, filed Oct. 14, 2016, which claims priority to the following Chinese patent applications, the disclosures of which are hereby expressly incorporated by reference herein in their entirety:

| Application No. | Filing Date |
| --- | --- |
| CN 201520799262.9 | Oct. 16, 2015 |
| CN 201520898479.5 | Nov. 12, 2015 |
| CN 201520959301.7 | Nov. 27, 2015 |
| CN 201620247404.5 | Mar. 29, 2016 |
| CN 201620452544.6 | May 18, 2016 |
| CN 201620452545.0 | May 18, 2016 |
| CN 201620452516.4 | May 18, 2016 |
| CN 201620452597.8 | May 18, 2016 |
| CN 201610329403.X | May 18, 2016 |

FIELD OF THE DISCLOSURE

The present disclosure relates to a multifunctional air pump. More particularly, the present disclosure relates to a multifunctional air pump for inflating and deflating an inflatable product, such as an inflatable mattress, and to a method for using the same.

BACKGROUND OF THE DISCLOSURE

The convenience of inflatable products has led to their adoption in a variety of household products, such as inflatable mattresses, inflatable pools and spas, inflatable furniture, and other inflatable products. However, over time, such inflatable products are susceptible to air leakage due to material deformation and/or long-term stress, which affects the user's comfort. With respect to an inflatable mattress, for example, the user may fill the bed to an initial pressure to achieve a desired hardness, but the mattress may leak air over time and become softer and softer.

SUMMARY

The present disclosure provides a multifunctional air pump for inflating and deflating an inflatable product. The multifunctional air pump includes an air pump assembly, a control module, and a remote user input. The air pump may be operated remotely for convenience. The air pump may also operate automatically to maintain the pressure of the inflatable product.

According to an embodiment of the present disclosure, a multifunctional air pump is provided including an air pump assembly and a control module. The air pump assembly includes a first opening in fluid communication with a surrounding atmosphere, a second opening in fluid communication with an inflatable product, a pump having an inlet and an outlet, and an air passageway having a first position in which the inlet of the pump communicates with the first opening and the outlet of the pump communicates with the second opening and a second position in which the inlet of the pump communicates with the second opening and the outlet of the pump communicates with the first opening. The control module is in electrical communication with the air pump assembly and has at least one communication module that is configured to communicate with a remote user input.

In certain embodiments, the control module is configured to operate the air pump assembly in an inflation mode with the pump on and the air passageway positioned in the first position and a deflation mode with the pump on and the air passageway positioned in the second position.

In certain embodiments, the control module is configured to operate the air pump assembly in an adjustment mode with the pump off and the air passageway positioned in the second position.

In certain embodiments, the remote user input includes an inflation button corresponding to the inflation mode, a deflation button corresponding to the deflation mode, and an adjustment button corresponding to the adjustment mode.

In certain embodiments, the control module is configured to operate the air pump assembly in a pressure maintenance mode with the pump on at a lower speed than the inflation mode and the air passageway positioned in the first position.

In certain embodiments, the control module operates a driving device that automatically rotates the air passageway between the first and second positions.

In certain embodiments, the air passageway is located within a core, and the driving device rotates the core by moving a rack having a geared relationship with the core.

In certain embodiments, a hand wheel is provided to manually rotate the air passageway between the first and second positions.

In certain embodiments, the control module controls operation of the pump based on at least one of a timer, a pressure detector, and a current detector.

In certain embodiments, a valve is located in the second opening, wherein the valve is biased closed when the air passageway is in the first position and is forced open when the air passageway is in the second position.

In certain embodiments, when the air passageway is in the second position, the air passageway is offset from a central axis of the pump.

In certain embodiments, the at least one communication module includes a WIFI chip, a Bluetooth chip, or an infrared chip.

In certain embodiments, the remote user input is one of a smartphone, a tablet, and a computer.

In certain embodiments, the remote user input is a dedicated remote control.

In certain embodiments, the air pump assembly is built into the inflatable product.

In certain embodiments, the inflatable product is a mattress.

According to another embodiment of the present disclosure, a multifunctional air pump is provided including an air pump assembly and a control module. The air pump assembly includes an air pump in fluid communication with an inflatable product and a surrounding atmosphere, wherein the air pump assembly is operable in an inflation mode in which the air pump assembly inflates the inflatable product by operating the air pump and directing air from the surrounding atmosphere to the inflatable product, a deflation mode in which the air pump assembly deflates the inflatable product by operating the air pump and directing air from the inflatable product to the surrounding atmosphere, and an adjustment mode in which the air pump assembly gradually deflates the inflatable product by allowing air to travel from the inflatable product to the surrounding atmosphere without operating the air pump. The control module is in electrical communication with the air pump assembly, the control module being configured to receive a user command and to operate the air pump assembly in one of the inflation, deflation, and adjustment modes based on the user command.

In certain embodiments, the air pump assembly includes a moveable air passageway having a first position in the inflation mode and a second position in the deflation and adjustment modes.

In certain embodiments, the control module automatically moves the air passageway between the first and second positions.

According to yet another embodiment of the present disclosure, a multifunctional air pump is provided including an air pump assembly and a control module. The air pump assembly includes an air pump in fluid communication with an inflatable product and a surrounding atmosphere, wherein the air pump assembly is operable in an inflation mode in which the air pump assembly inflates the inflatable product by operating the air pump at a first speed and directing air from the surrounding atmosphere to the inflatable product, a deflation mode in which the air pump assembly deflates the inflatable product by operating the air pump and directing air from the inflatable product to the surrounding atmosphere, and a maintenance mode in which the air pump assembly maintains inflation of the inflatable product by operating the air pump at a second speed lower than the first speed and directing air from the surrounding atmosphere to the inflatable product. The control module is in electrical communication with the air pump assembly, the control module being configured to receive a user command and to operate the air pump assembly in one of the inflation, deflation, and maintenance modes based on the user command.

In certain embodiments, the control module communicates with at least one of a timer, a pressure detector, and a current detector in the maintenance mode.

In certain embodiments, the control module stops operating the air pump in the maintenance mode when the inflatable product reaches a predetermined pressure.

In certain embodiments, the predetermined pressure is adjustable by a user.

In certain embodiments, the air pump is coupled to an air admission valve that closes in the inflation and deflation modes and opens in the maintenance mode.

In certain embodiments, the air pump is coupled to the air admission valve via a one-way bearing.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
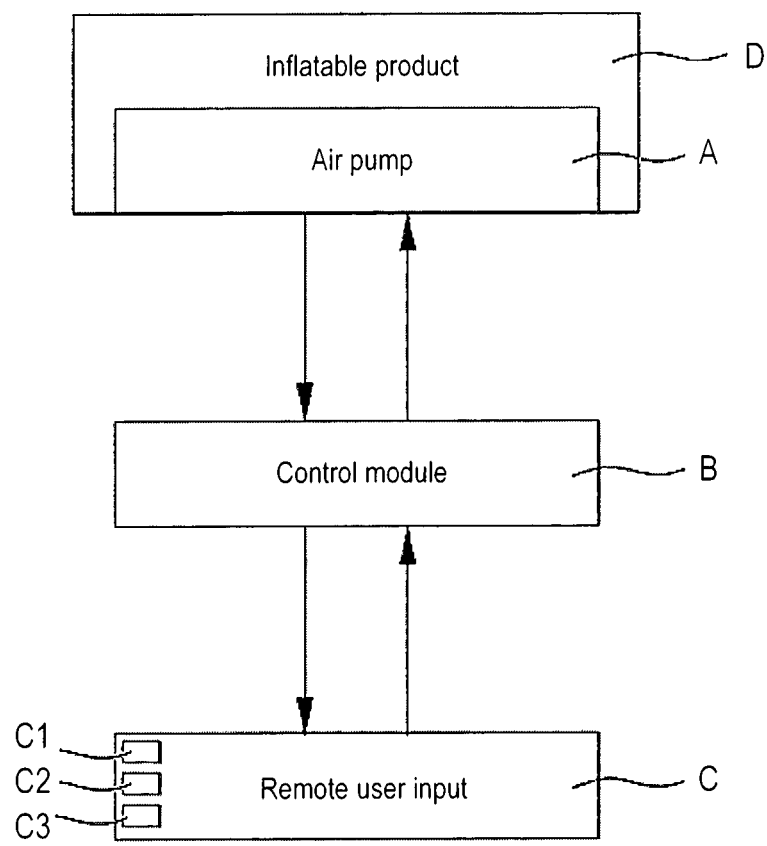
FIG. 1 is a schematic diagram of a multifunctional air pump for inflating and deflating an inflatable product, the multifunctional air pump including an air pump assembly, a control module, and a remote user input.
Figure 2:
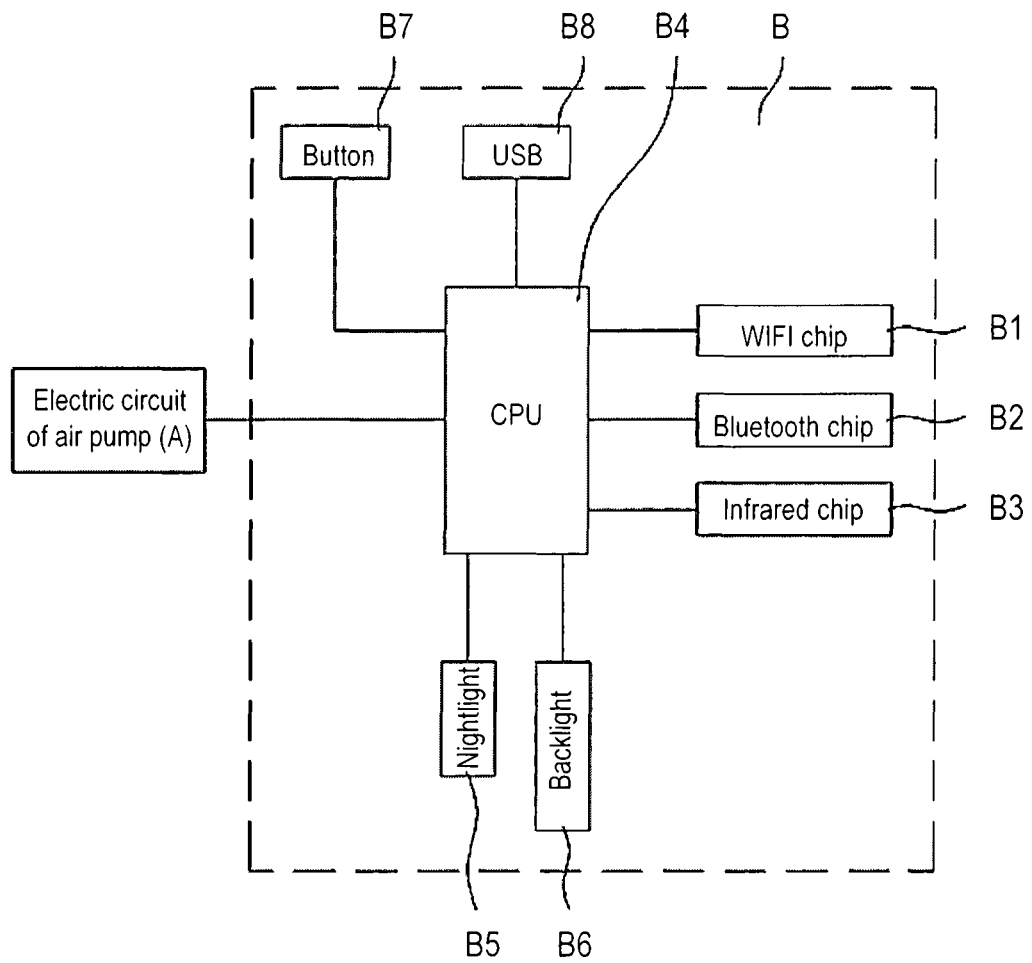
FIG. 2 is a schematic diagram of the control module.

Referring to FIGS. 1 and 2, a multifunctional air pump is disclosed including an air pump assembly A, a control module B, and a remote user input C. The air pump assembly A communicates with an inflatable product D, such as an inflatable mattress, an inflatable pool or spa, an inflatable furniture item, or another inflatable product. In certain embodiments, the air pump assembly A is built into or otherwise coupled to the inflatable product D. The control module B is electrically coupled to the air pump assembly A and is wirelessly coupled to the remote user input C for communication therewith. The communication between the control module B and the remote user input C may be one-way or two-way.

As shown in FIG. 2, the illustrative control module B includes at least one communication module, such as a WIFI chip B1, a Bluetooth chip B2, and/or an infrared chip B3. The control module B also includes a central processing unit (CPU) B4 connected to and configured to control the communication modules B1, B2, B3. The CPU B4 is also connected to and configured to control a nightlight B5, a backlight B6, at least one button B7, and a USB port B8. As discussed further below, air pump assembly A may have various modes of operation. The backlight B6 may be used for communicating the working state of air pump assembly A to the user, and the button B7 may be used for selecting the desired mode of operation. The USB port B8 is configured to receive, power, and/or operate a USB-enabled device, such as a cell phone or a music player. The control module B is coupled to a power supply (not shown). The power supply may be an internal battery or an external power source, such as a standard electrical outlet.

Referring still to FIG. 2, the illustrative remote user input C is configured to receive user commands and communicate those commands to the air pump assembly A via the control module B. An exemplary remote user input C includes a remote control that is sold with and dedicated to the control module B. Other exemplary terminals C include smartphones, tablets, or computers, for example, having software installed thereon to communicate with the control module B. The remote user input C may include a plurality of user inputs, such as an inflation button C1, a deflation button C2, and/or an adjustment button C3.

In operation, the user may input commands to the remote user input C to control operation of the air pump assembly A via one or more communication modules of the control module B, such as the WIFI chip B1, the Bluetooth chip B2, and/or the infrared chip B3 of the control module B. For example, if the user presses the inflation button C1 on the remote user input C, the command may be sent to an appropriate communication module B1, B2, B3, of the control module B and then to the CPU B4 of the control module B to operate the air pump assembly A in an inflation mode.

Referring next to FIGS. 3-8, a first embodiment of the air pump assembly A is shown and includes a seat or housing 1, an air pump 2 located within the housing 1, a moveable air core 3, and an automatic operation mechanism 4.

The housing 1 may be built into an inflatable chamber of the inflatable product D (FIG. 1). The housing 1 includes a cover panel 11 with a first opening 111 in fluid communication with the surrounding atmosphere. The housing 1 also includes a second opening or vent 12 in fluid communication with the inflatable product. The vent 12 is controlled by a one-way check valve 13 that is biased closed. In addition, the cover panel 11 includes an inflation switch or button 112, a deflation switch or button 113, an adjustment switch or button 114, and an indicator light 115 for displaying whether the system is operational, as described further below.

The air pump 2 includes a body 21, a blade 22, and a motor 23 that drives the blade 22. The body 21 defines an air inlet 211 and air outlet 212, wherein the air inlet 211 is arranged along the central axis of the blade 22 and the air outlet 212 is arranged tangent to the blade 22. The blade 22 is received within the body 21 and may include a single blade or multiple blade groups. In operation, the blade 22 draws air into the air inlet 211 and exhausts air through the air outlet 212.

Figure 3:
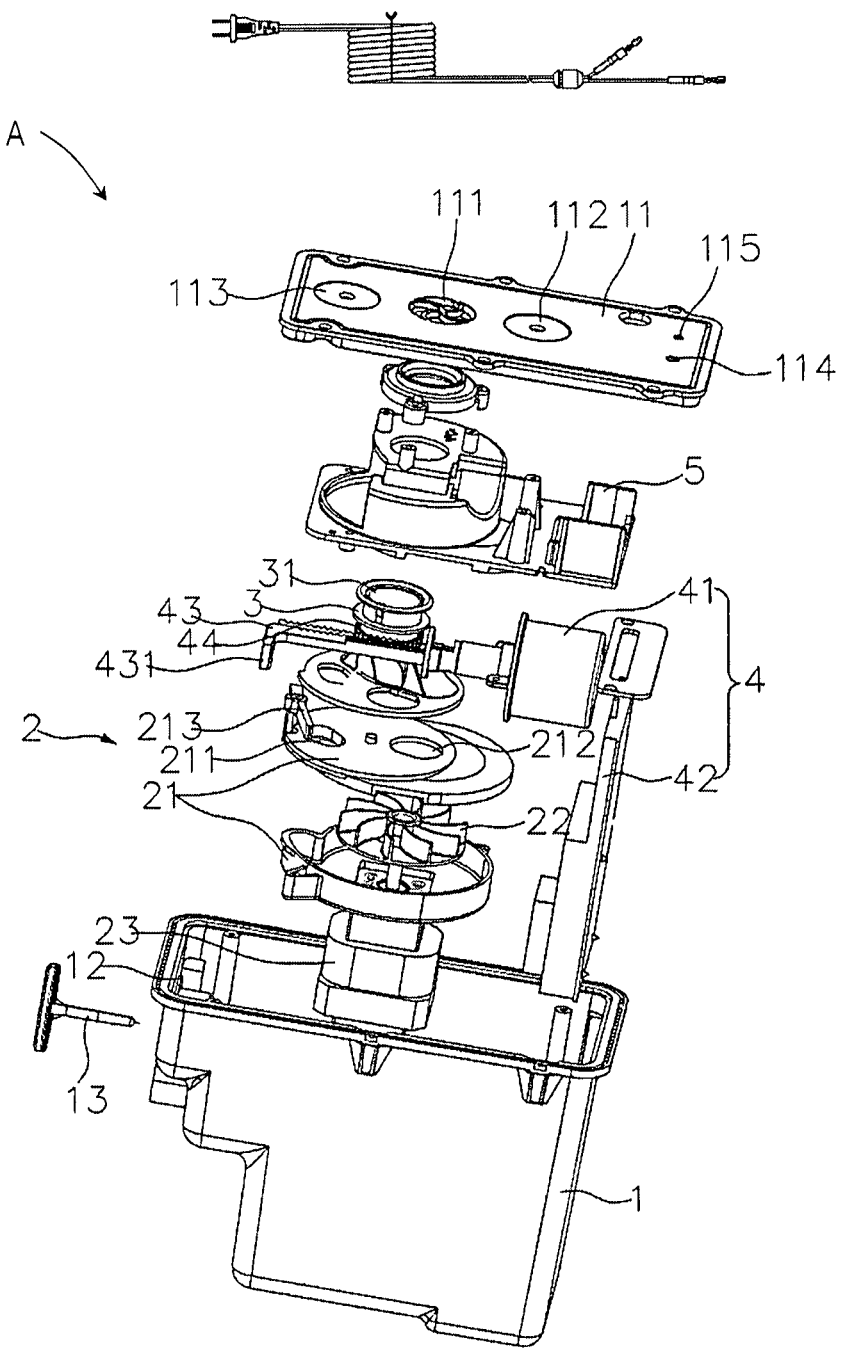
FIG. 3 is a perspective view of a first air pump assembly of the present disclosure.

The air core 3 has an internal passageway 31 in fluid communication with the opening 111 of the housing 1 on one end (i.e., the top end in FIG. 3) and in selective fluid communication with the air pump 2 on the other end (i.e., the bottom end in FIG. 3). The air core 3 is configured to rotate, swing, or otherwise move to selectively communicate with the air inlet 211 or the air outlet 212 of the air pump 2. In certain embodiments, the internal passageway 31 of the air core 3 may have a horn shape and may extend along or eccentric to a central axis of the air pump 2. The one-way valve 13 may be opened using the automatic operation mechanism 4, as discussed further below. In other embodiments, the external surface of the air core 3 may have an eccentric setting such that the air core 3 forms a cam surface that is configured to selectively push the one-way valve 13 and open the vent 12.

The automatic operation mechanism 4 is configured to move the air core 3 to place the internal passageway 31 in fluid communication with the air inlet 211 or the air outlet 212 of the air pump 2. As shown in FIG. 3, the operation mechanism 4 includes a driving device 41, illustratively a magnetic valve, a circuit board 42 that powers the driving device 41 and has a timer (not shown), a rack 43 mechanically driven by the driving device 41, and a gear 44 on the air core 3 for engaging with the rack 43 to rotate the air core 3. Other suitable driving devices 41 include electric motors, for example.

Although described above with respect to the air pump assembly A, some of these elements may be considered part of the control module B (FIGS. 1 and 2). For example, the circuit board 42 may correspond to the CPU B4 of the control module B, the buttons 112, 113, may correspond to the button B7 of the control module B, and the light 115 may correspond to one of the lights B5, B6 of the control module B.

Figure 4:
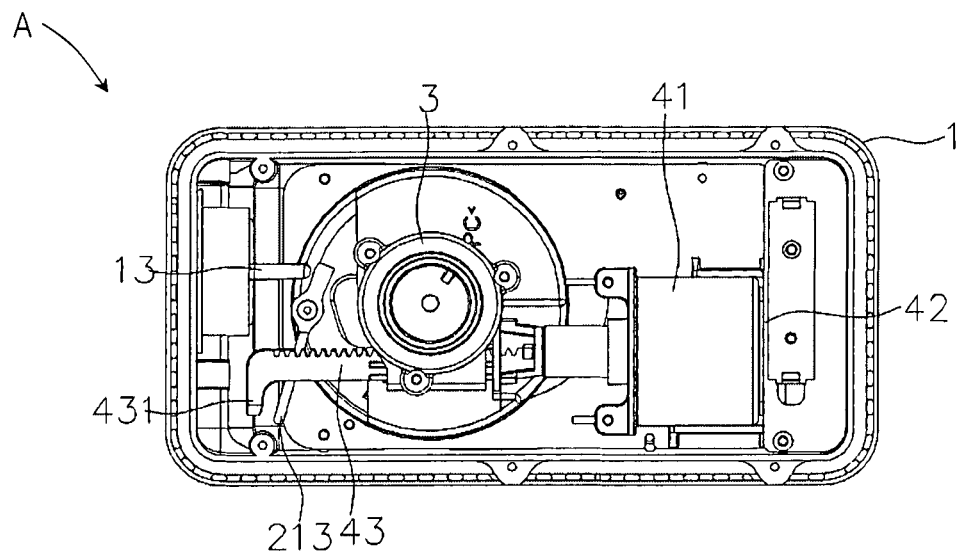
FIG. 4 is a cross-sectional view of the first air pump assembly of FIG. 3, wherein the first air pump assembly is shown in an inflation mode.
Figure 5:
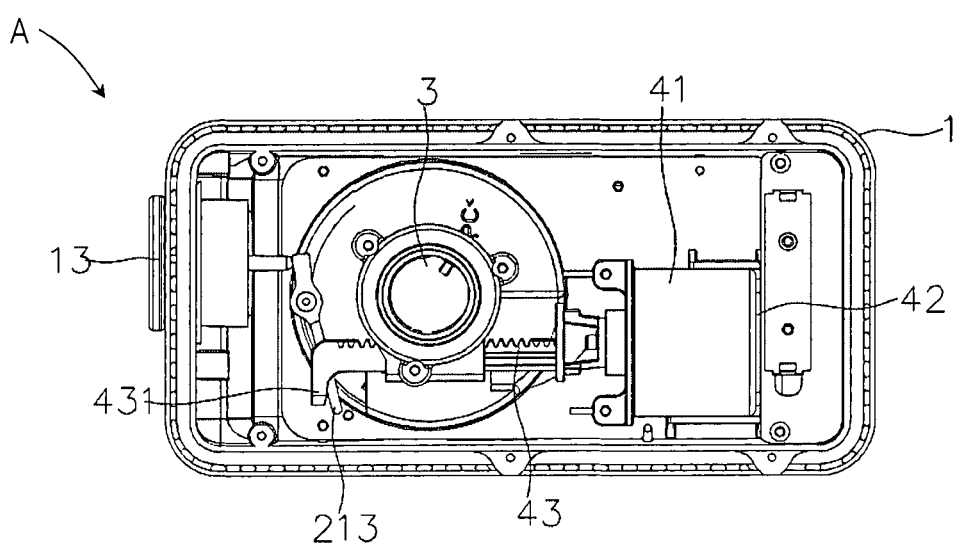
FIG. 5 is another cross-sectional view of the first air pump assembly of FIG. 3, wherein the first air pump assembly is shown in a deflation mode.

As shown in FIGS. 3-5, the air pump 2 includes a lever or push rod 213 that is pivotally coupled to the body 21, such as via a pivot pin (not shown). The operation mechanism 4 includes a corresponding finger or pull rod 431 coupled to a free end of the rack 43. When the rack 43 is extended, as shown in FIG. 4, the one-way valve 13 may remain closed. By contrast, when the rack 43 is retracted by the driving device 41, as shown in FIG. 5, the pull rod 431 contacts and pivots the push rod 213 into engagement with the one-way valve 13, thereby forcing the one-way valve 13 open.

Returning to FIG. 3, an upper pump cover 5 may be provided to support and couple the components inside the housing 1, such as the air pump 2, the air core 3, and the operation mechanism 4.

The multifunctional air pump is configured to operate in an inflation mode, a deflation mode, and an adjustment mode. The indicator light 115 may illuminate in one or more modes of operation whenever the motor 23 is running. Each mode of operation is described further below.

Figure 6:
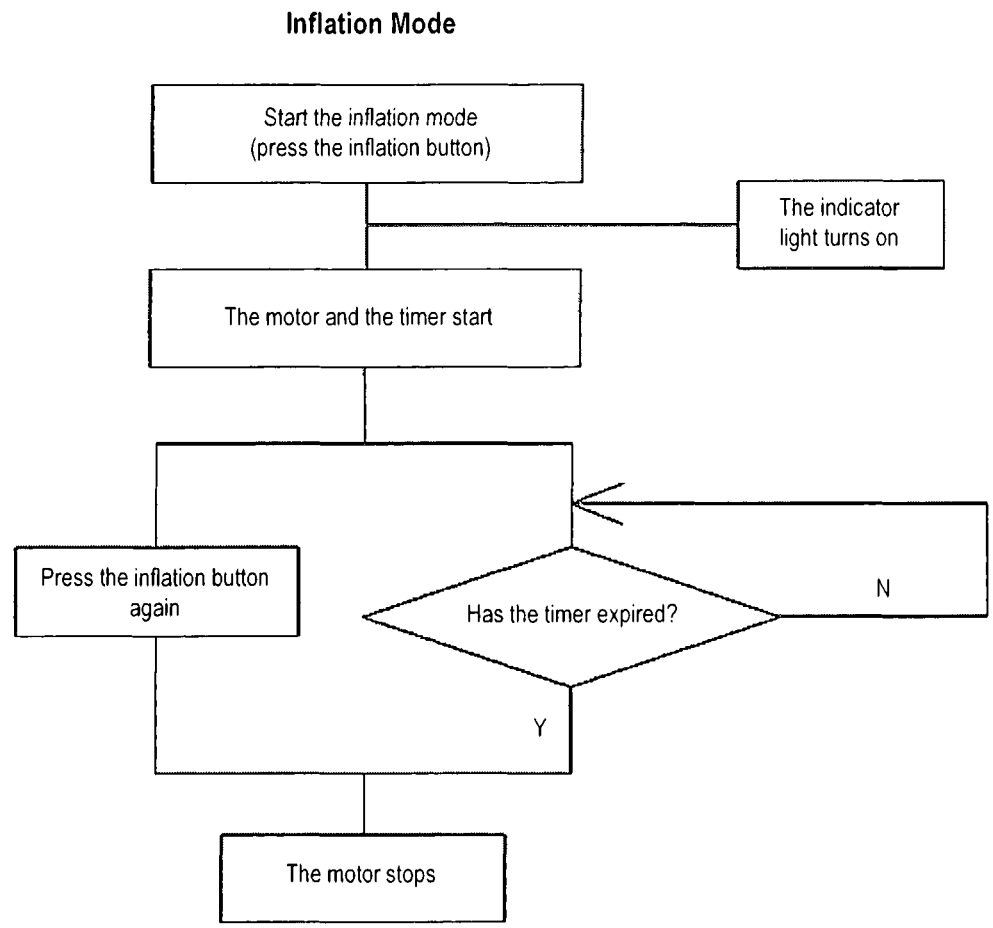
FIG. 6 is a flow chart for operating the first air pump assembly in the inflation mode of FIG. 4.

The inflation mode is shown in FIGS. 4 and 6. In this inflation mode, the passageway 31 of the air core 3 communicates with the air inlet 211 of the air pump 2. In this arrangement, the air inlet 211 of the air pump 2 communicates with the surrounding atmosphere via the passageway 31 and the opening 111, while the air outlet 212 of the air pump 2 communicates with the inflatable product via the vent 12. When the user operates the inflation button 112, the motor 23 of the air pump 2 begins to operate. The one-way valve 13 opens under the air pressure from the air pump 2 to allow air to enter and inflate the inflatable product via the open vent 12. Operating the inflation button 112 also causes the timer on the circuit board 42 to start timing. If the user operates the inflation button 112 a second time, the motor 23 of the air pump 2 will stop operating. Thus, the user is able to interrupt the inflation mode by operating the inflation button 112 a second time. Otherwise, the motor 23 will continue operating until the timer expires after a predetermined time period. According to an exemplary embodiment, this time period is selected and programmed to ensure that the corresponding inflatable product is fully inflated when the timer expires. When the inflatable product is a mattress, the predetermined time may be about 3 to 8 minutes, more specifically about 5 to 6 minutes. When the motor 23 stops operating, the one-way valve 13 returns to its normally closed position to close the vent 12 and maintain the pressure of the inflatable product.

Figure 7:
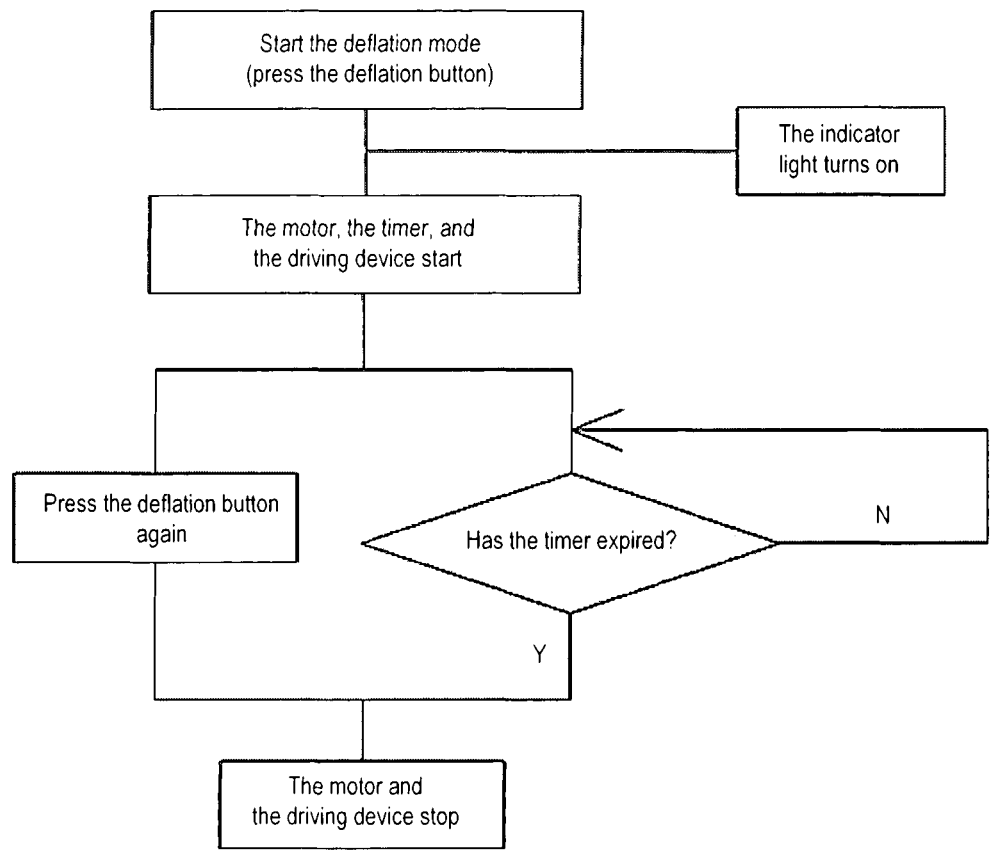
FIG. 7 is a flow chart for operating the first air pump assembly in the deflation mode of FIG. 5.

The deflation mode is shown in FIGS. 5 and 7. When the user operates the deflation button 113, the motor 23 of the air pump 2 and the driving device 41 of the operation mechanism 4 both begin to operate simultaneously. The driving device 41 retracts the rack 43, and the rack 43 rotates the air core 3 so that the passageway 31 moves from the air inlet 211 of the air pump 2 to the air outlet 212 of the air pump 2. In this arrangement, the air inlet 211 of the air pump 2 communicates with the inflatable product via the vent 12, while the air outlet 212 of the air pump 2 communicates with the surrounding atmosphere via the passageway 31 and the opening 111. At the same time, the pull rod 431 of the rack 43 contacts and pivots the push rod 213 into engagement with the one-way valve 13, thereby forcing the one-way valve 13 open. With the motor 23 running, the air inlet 211 of the air pump 2 draws air out of and deflates the inflatable product via the open vent 12. Operating the deflation button 113 also causes the timer on the circuit board 42 to start timing. If the user operates the deflation button 113 a second time, both the motor 23 of the air pump 2 and the driving device 41 of the operation mechanism 4 will stop operating. Thus, the user is able to interrupt the deflation mode by operating the deflation button 113 a second time. Otherwise, the motor 23 and the driving device 41 will continue operating until the timer expires after a predetermined time period. According to an exemplary embodiment, this time period is selected and programmed to ensure that the corresponding inflatable product is fully deflated when the timer expires. When the inflatable product is a mattress, the predetermined time may be about 3 to 8 minutes, more specifically about 5 to 6 minutes. When the driving device 41 stops operating, the rack 43 returns to the extended position shown in FIG. 4, thereby releasing the push rod 213 and allowing the one-way valve 13 to close.

Figure 8:
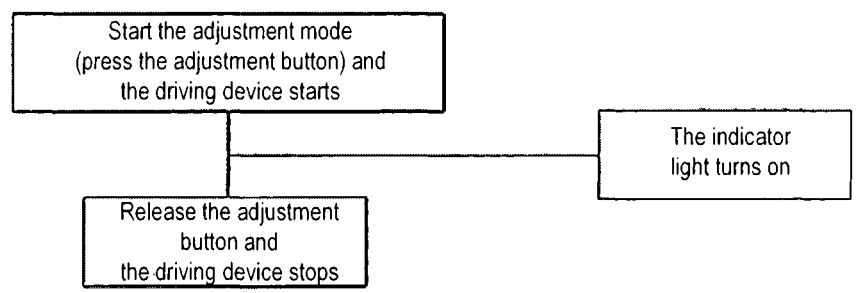
FIG. 8 is a flow chart for operating the first air pump assembly in an adjustment mode.

The adjustment mode is shown in FIG. 8. When the user operates the adjustment button 114, the driving device 41 operates and retracts the rack 43 to the retracted position shown in FIG. 5. In this retracted position, the pull rod 431 of the rack 43 contacts and pivots the push rod 213 into engagement with the one-way valve 13, thereby forcing the one-way valve 13 open. Although the motor 23 of the air pump 2 may not be operating, air from the inflatable product may gradually leak out of and deflate the inflatable product via the open vent 12. Thus, the user may use the adjustment mode when the inflatable product is too hard and requires a slight or gradual pressure adjustment. When the user releases the adjustment button 114, the driving device 41 stops operating, and the rack 43 returns to the extended position shown in FIG. 4. In this extended position, the pull rod 431 of the rack 43 releases the push rod 213 and allows the one-way valve 13 to close.

The air pump assembly A may be controlled remotely using the remote user input C, as discussed above with respect to FIGS. 1 and 2. The air pump assembly A may also be controlled directly at the air pump assembly A. For example, the control module B may enter: (1) the inflation mode when the user presses the inflation button C1 on the remote user input C or the inflation button 112 located on the air pump assembly A; (2) the deflation mode when the user presses the deflation button C2 on the remote user input C or the deflation button 113 located on the air pump assembly A; and (3) the adjustment mode when the user presses the adjustment button C3 on the remote user input C or the adjustment button 114 located on the air pump assembly A.

Referring next to FIGS. 9-15, a second embodiment of the air pump assembly A' is shown. The second air pump assembly A' includes a seat or housing 1', an air pump 2' located within the housing 1', and various other features in common with the first air pump assembly A, except as described below. Some of the elements discussed below may be considered part of the control module B (FIGS. 1 and 2).

The housing 1' may be built into an inflatable chamber of the inflatable product D (FIG. 1). The housing 1' includes an opening 11' in fluid communication with the surrounding atmosphere. The housing 1' also includes an opening or vent 12' in fluid communication with the inflatable product. The vent 12' is controlled by a one-way check valve 13' that is biased closed. The housing 1' also includes a timer 3' and a current detector 4'. The housing 1' may include a first chamber for the air pump 2' and a separate chamber for the timer 3' and the current detector 4' such that the air pump 2' is at least partially separated from the timer 3' and the current detector 4'.

Figure 11:
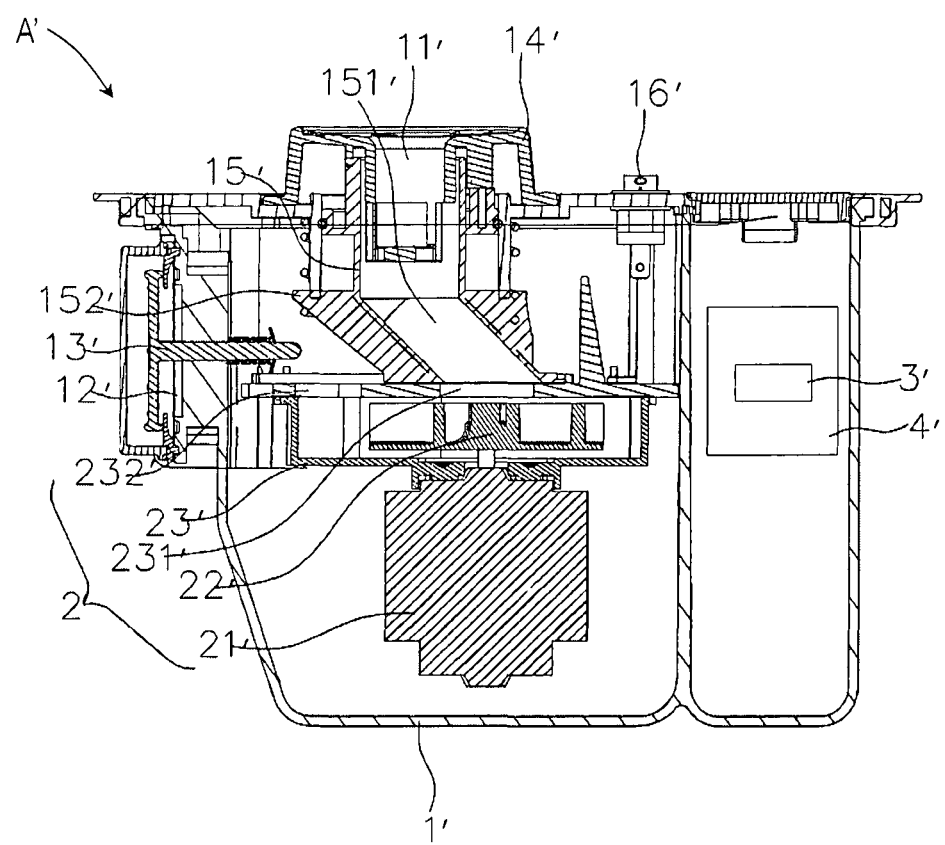
FIG. 11 is a cross-sectional view of the second air pump assembly of FIG. 9.
Figure 12:
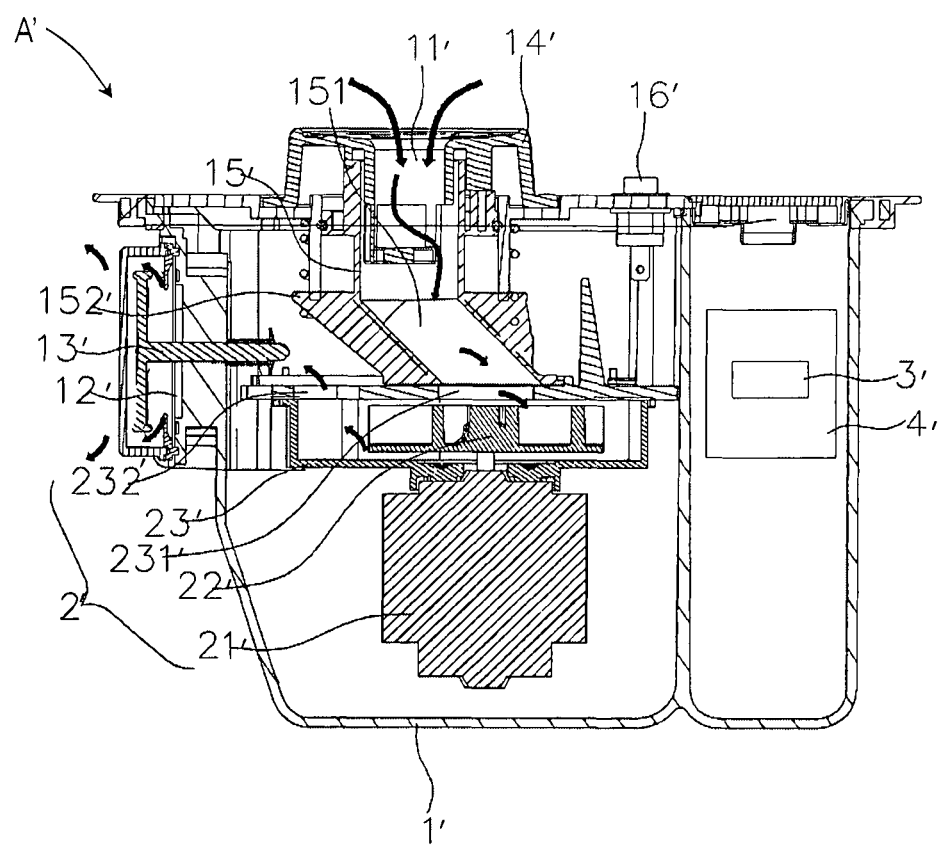
FIG. 12 is another cross-sectional view of the second air pump assembly of FIG. 9, wherein the second air pump assembly is shown in an inflation mode.
Figure 13:
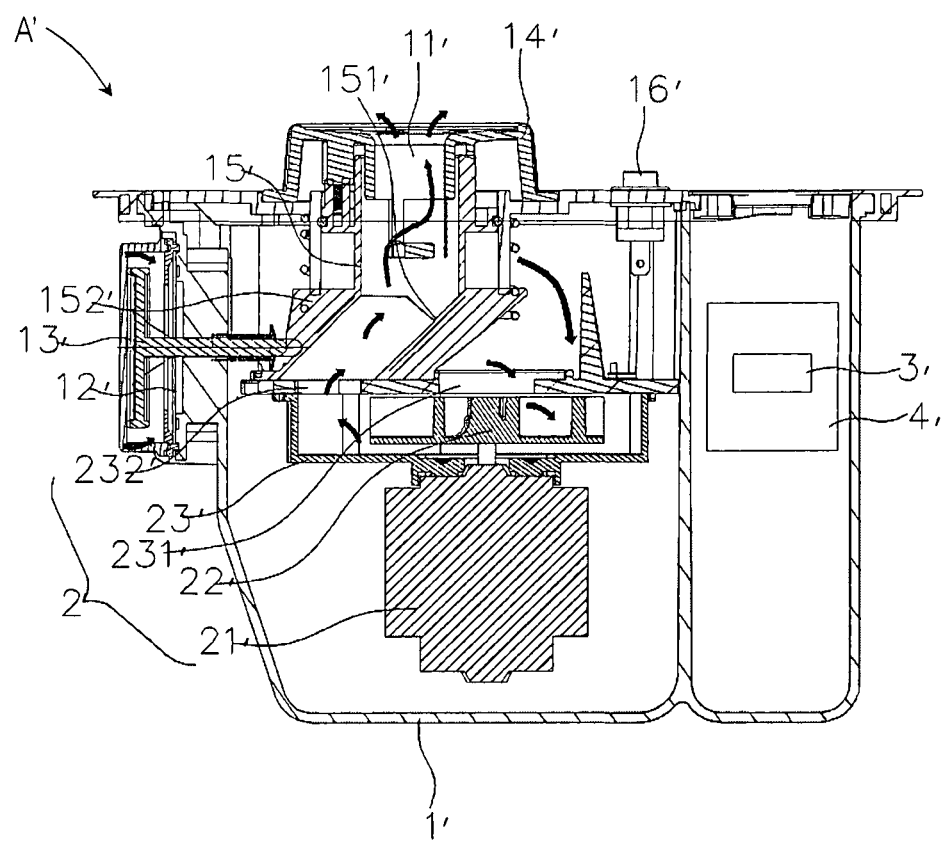
FIG. 13 is another cross-sectional view of the second air pump assembly of FIG. 9, wherein the second air pump assembly is shown in a deflation mode.

As shown in FIGS. 11-13, the second air pump assembly A' also includes an air core 15' rotatably coupled to a hand wheel 14'. It is also within the scope of the present disclosure that the air core 15' may be rotated automatically using the automatic operation mechanism 4 of FIGS. 3-8 or another suitable mechanism. The opening 11' may extend through the hand wheel 14'. The air core 15' includes an internal passageway 151' in fluid communication with the opening 11' on one end (i.e., the top end in FIG. 11) and in selective fluid communication with the air pump 2' on the other end (i.e., the bottom end in FIG. 11). The illustrative internal passageway 151' has a horn shape and extends eccentric to a central axis of the air pump 2'. The external surface of the air core 15' has an eccentric setting such that the air core 15' includes a cam 152' that is configured to selectively push the one-way valve 13' and open the vent 12'.

The air pump 2' includes a body 23', a blade 22', and a motor 21' that drives the blade 22'. The body 23' of the air pump 2' includes an air inlet 231' and an air outlet 232', wherein the air inlet 231' is arranged along the central axis of the blade 22' and the air outlet 232' is arranged tangent to the blade 22'. In operation, the blade 22' draws air into the air inlet 231' and exhausts air through the air outlet 232'.

Figure 9:
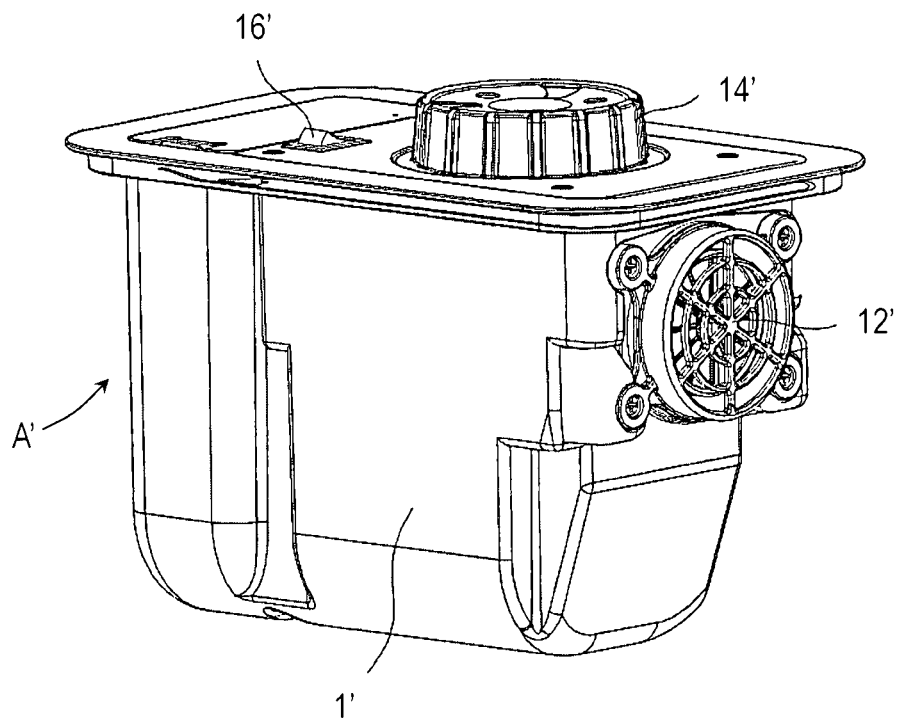
FIG. 9 is a perspective view of a second air pump assembly of the present disclosure.
Figure 10:
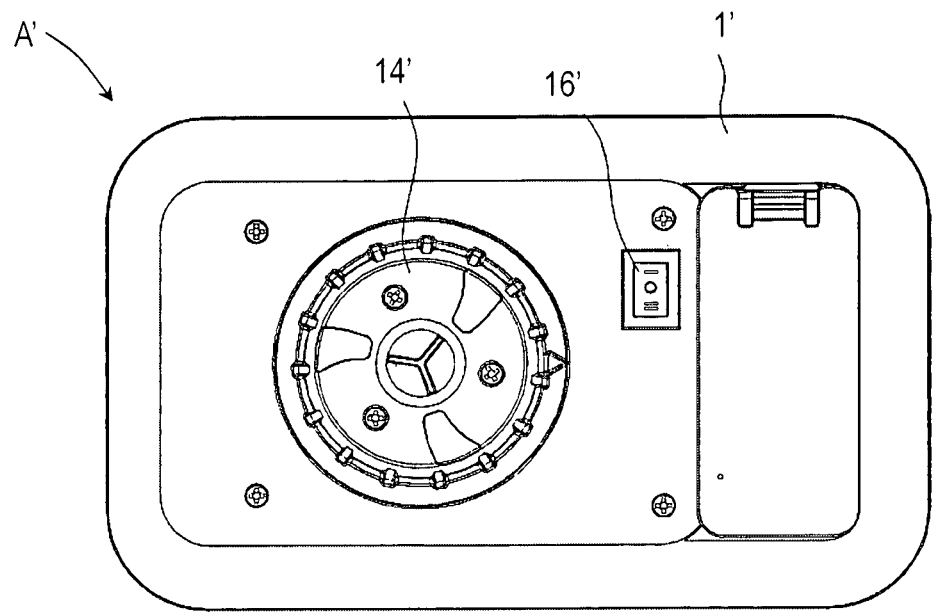
FIG. 10 is a top plan view of the second air pump assembly of FIG. 9.

The motor 21' of the air pump 2' is a two-speed motor having a high-speed rotary gear and a low-speed rotary gear. As shown in FIGS. 9 and 10, the motor 21' is controlled via a gear switch 16' that is located adjacent to the hand wheel 14' for access by the user. The gear switch 16' may have a neutral state (e.g., "0"), a high-speed state (e.g., "1"), and a low-speed state (e.g., "2"). The illustrative gear switch 16' is a 3-position rocker switch, but it is also within the scope of the present disclosure that the gear switch 16' may have buttons corresponding to each state. When the gear switch 16' is in the neutral state or position, the motor 21' is turned off. When the gear switch 16' is in the high-speed state or position, the motor 21' operates in the high-speed gear. When the gear switch 16' is in the low-speed state or position, the motor 21' operates in the low-speed gear. In this embodiment, the motor 21', the timer 3', the current detector 4', the gear switch 16', and the power supply form an electrical circuit of the air pump assembly A'.

The air pump assembly A' is configured to operate in an inflation mode, a deflation mode, and a pressure maintenance mode. Each mode of operation is described further below.

Figure 14:
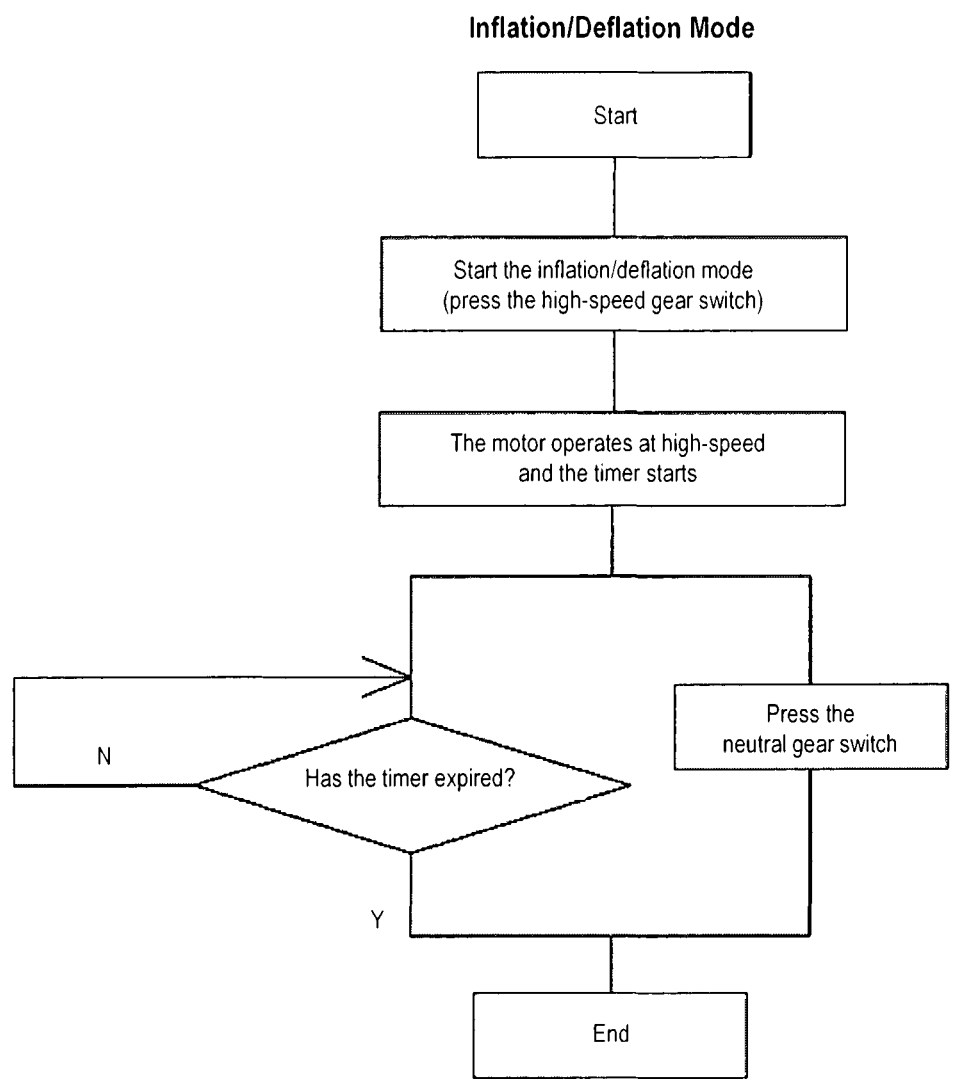
FIG. 14 is a flow chart for operating the second air pump assembly in the inflation mode of FIG. 12 and/or the deflation mode of FIG. 13.

The inflation mode is shown in FIGS. 12 and 14. In this inflation mode, the user turns the hand wheel 14' to align the passageway 151' of the air core 15' with the air inlet 231' of the air pump 2'. In this arrangement, the air inlet 231' of the air pump 2' communicates with the surrounding atmosphere via the passageway 151' and the opening 11', while the air outlet 232' of the air pump 2' communicates with the inflatable product via the vent 12'. When the user moves the gear switch 16' to the high-speed position (e.g., "1"), the motor 21' of the air pump 2' begins to operate in the high-speed gear. The one-way valve 13' opens under the air pressure from the air pump 2' to allow air to enter and inflate the inflatable product via the open vent 12'. Pressing the gear switch 16' to the high-speed position also causes the timer 3' to start timing. If the user moves the gear switch 16' back to the neutral position (e.g., "0"), the motor 21' of the air pump 2' will stop operating. Thus, the user is able to interrupt the inflation mode by operating the gear switch 16'. Otherwise, the motor 21' will continue operating until the timer expires after a predetermined time period. According to an exemplary embodiment, this time period is selected and programmed to ensure that the corresponding inflatable product is fully inflated when the timer expires. When the inflatable product is a mattress, the predetermined time may be about 3 to 8 minutes, more specifically about 5 to 6 minutes. When the motor 21' stops operating, the one-way valve 13' returns to its normally closed position to close the vent 12' and maintain the pressure of the inflatable product.

The deflation mode is shown in FIGS. 13 and 14. In this deflation mode, the user turns the hand wheel 14' to align the passageway 151' of the air core 15' with the air outlet 232' of the air pump 2'. In this arrangement, the air inlet 231' of the air pump 2' communicates with the inflatable product via the vent 12', while the air outlet 232' of the air pump 2' communicates with the surrounding atmosphere via the passageway 151' and the opening 11'. At the same time, the cam 152' of the air core 15' contacts and forces the one-way valve 13' open. When the user moves the gear switch 16' to the high-speed position (e.g., "1"), the motor 21' of the air pump 2' begins to operate in the high-speed gear. With the motor 21' running, the air inlet 231' of the air pump 2' draws air out of and deflates the inflatable product via the open vent 12'. Pressing the gear switch 16' to the high-speed position also causes the timer 3' to start timing. If the user moves the gear switch 16' back to the neutral position (e.g., "0"), the motor 21' of the air pump 2' will stop operating. Thus, the user is able to interrupt the deflation mode by operating the gear switch 16'. Otherwise, the motor 21' will continue operating until the timer expires after a predetermined time period. According to an exemplary embodiment, this time period is selected and programmed to ensure that the corresponding inflatable product is fully deflated when the timer expires. When the inflatable product is a mattress, the predetermined time may be about 3 to 8 minutes, more specifically about 5 to 6 minutes.

Figure 15:
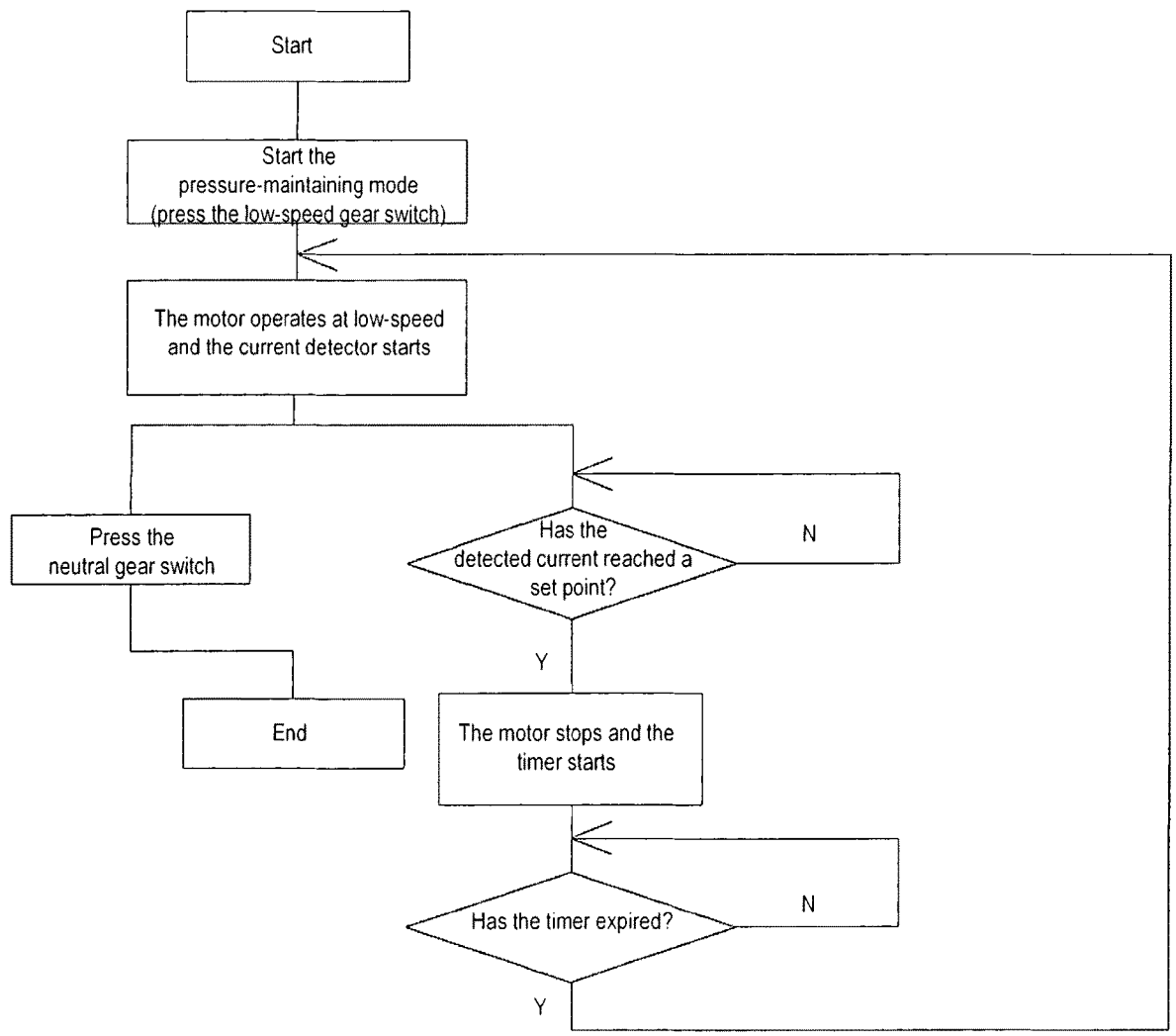
FIG. 15 is a flow chart for operating the second air pump assembly in a pressure maintenance mode.

The pressure maintenance mode is shown in FIG. 15. In this maintenance mode, the user turns the hand wheel 14' to align the passageway 151' of the air core 15' with the air inlet 231' of the air pump 2', like the inflation mode of FIG. 12. When the user moves the gear switch 16' to the low-speed position (e.g., "2"), the motor 21' of the air pump 2' begins to operate in the low-speed gear. The one-way valve 13' opens under the air pressure from the air pump 2' to allow air to enter and inflate the inflatable product via the open vent 12'. Pressing the gear switch 16' to the low-speed position also causes the current detector 4' to start operating. As the pressure in the inflatable product gradually increases, the current of the motor 21' increases, and this increasing current is detected by the current detector 4'. The motor 21' continues its low-speed operation until the detected current reaches a predetermined set point. According to an exemplary embodiment, this set point is selected and programmed to ensure that the corresponding inflatable product is fully inflated. Then, the motor 21' stops operating, and the timer 3' starts timing. When the timer 3' expires, such as after about 1 to 10 minutes, the process automatically repeats to continue maintaining the pressure of the inflatable product and ensuring the inflatable product's normal use and comfort. The user can interrupt the pressure maintenance mode and stop the motor 21' by moving the gear switch 16' back to the neutral position (e.g., "0").

Figure 11A:
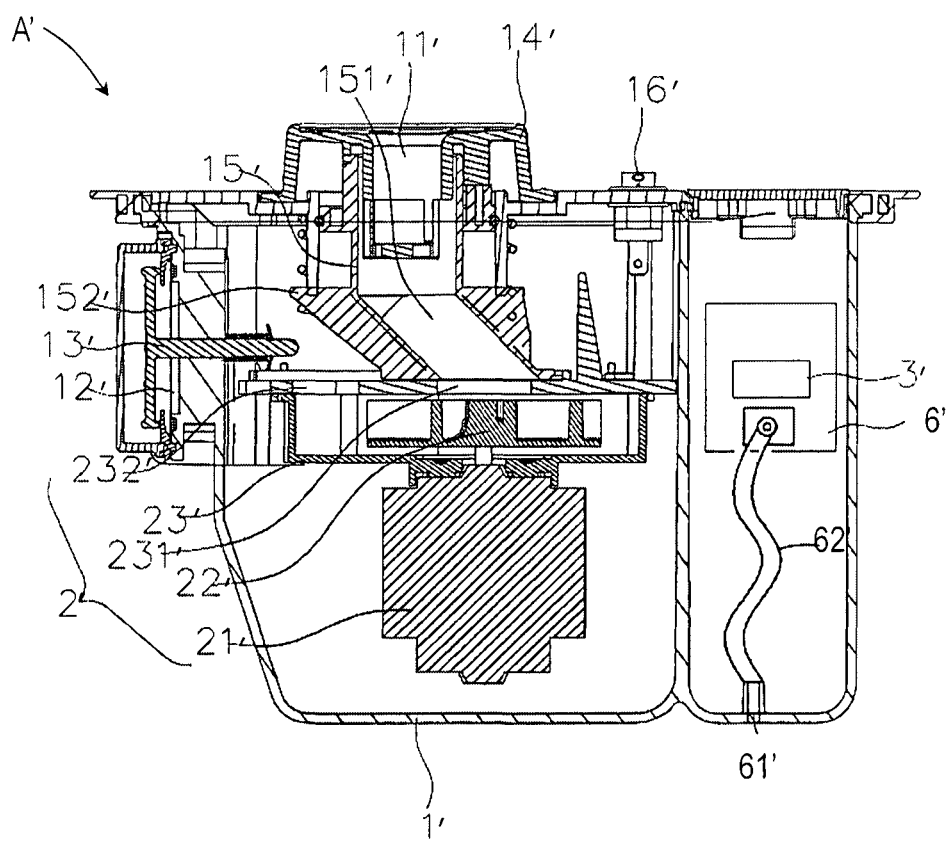
FIG. 11A is a cross-sectional view similar to FIG. 11 showing an alternative embodiment of the second air pump assembly.

In an alternative embodiment, rather than using the current detector 4' to monitor the current of the motor 21', an electronic pressure detector 6' is provided to monitor the pressure inside the inflatable product. An exemplary pressure detector 6' is shown in FIG. 11A and includes a detection hole 61' in fluid communication with the inflatable product and a tube 62' extending between the detection hole 61' and the pressure detector 6'. With the motor 21' running, the pressure in the inflatable product gradually increases. This increasing pressure is detected by the pressure detector 6' through the detection hole 61' and the tube 62'. The motor 21' continues its low-speed operation until the detected pressure reaches a predetermined set point. According to an exemplary embodiment, this set point is selected and programmed to ensure that the corresponding inflatable product is fully inflated. When the inflatable product is a mattress, for example, the pressure set point may be about 0.1 psi, 0.2 psi, 0.3 psi, 0.4 psi, or more. The pressure maintenance mode may continue according to FIG. 15.

The above modes of operation are summarized in Table 1.

TABLE 1

| Mode | Check Valve (13') | Hand Wheel (14') | Gear Switch (16') | Detector (4' or 6') |
| --- | --- | --- | --- | --- |
| Off | Biased closed | — | Neutral state | Inactive |
| Inflation | Biased closed but opens under pressure from pump 2' | Aligned with air inlet 231' of pump 2' | High-speed state | Inactive |
| Deflation | Forced open | Aligned with air outlet 232' of pump 2' | High-speed state | Inactive |
| Pressure Maintenance | Biased closed but opens under pressure from pump 2' | Aligned with air inlet 231' of pump 2' | Low-speed state | Active |

The air pump assembly A' may be controlled remotely using the remote user input C, as discussed above with respect to FIGS. 1 and 2. For example, the user may press buttons on the remote user input C corresponding to the gear switch 16' on the air pump assembly A'. The air pump assembly A' may also be controlled directly by pressing the gear switch 16' on the air pump assembly A'.

Referring next to FIGS. 16-20, a third embodiment of the air pump assembly A" is shown. The third air pump assembly A" includes a seat or housing 1", an air pump 2" located within the housing 1", and various other features in common with the first and second air pump assemblies A, A', except as described below. Some of the elements discussed below may be considered part of the control module B (FIGS. 1 and 2).

The housing 1" may be built into an inflatable chamber of the inflatable product D (FIG. 1). The housing 1" includes an opening 11" in fluid communication with the surrounding atmosphere. The housing 1" also includes an opening or vent 12" in fluid communication with the inflatable product. The vent 12" is controlled by a one-way check valve 13" that is biased closed. The housing 1" also includes a cover panel 10" with an indicator light 101" and a digital display 102". The housing 1" further includes a detection hole 17" in fluid communication with the inflatable product, an electronic pressure detector 18", and a tube 19" extending between the detection hole 17" and the pressure detector 18".

Figure 18:
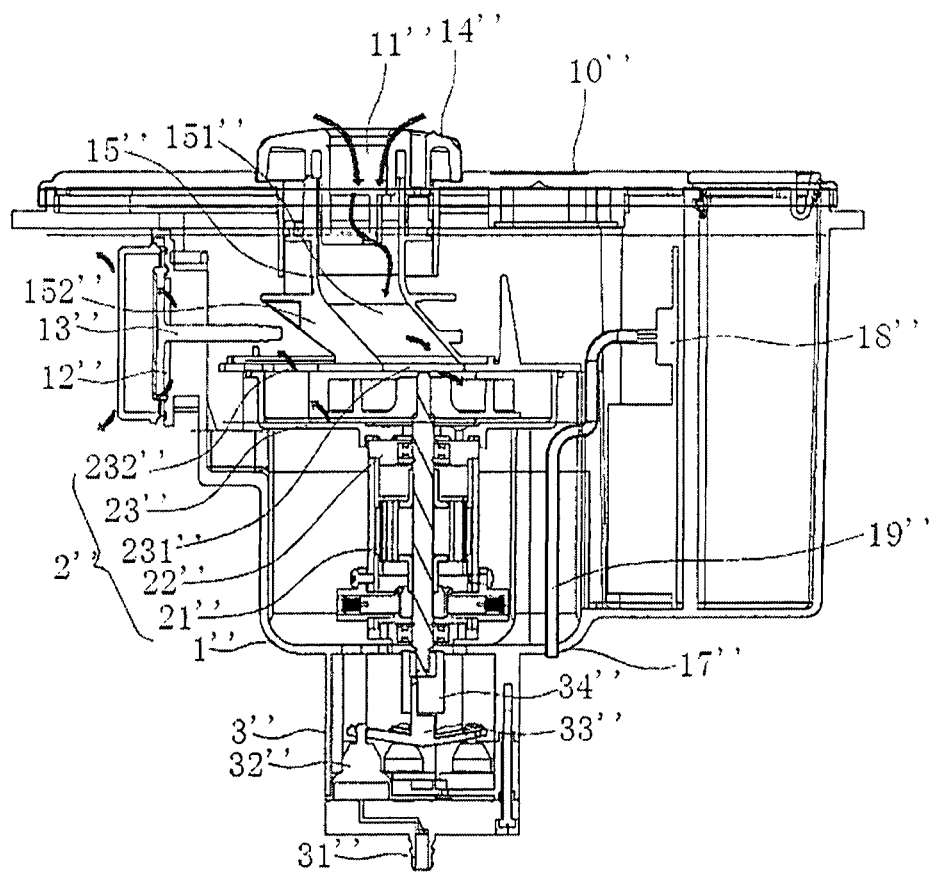
FIG. 18 is a cross-sectional view of the third air pump assembly of FIG. 16, wherein the third air pump assembly is shown in an inflation mode.
Figure 19:
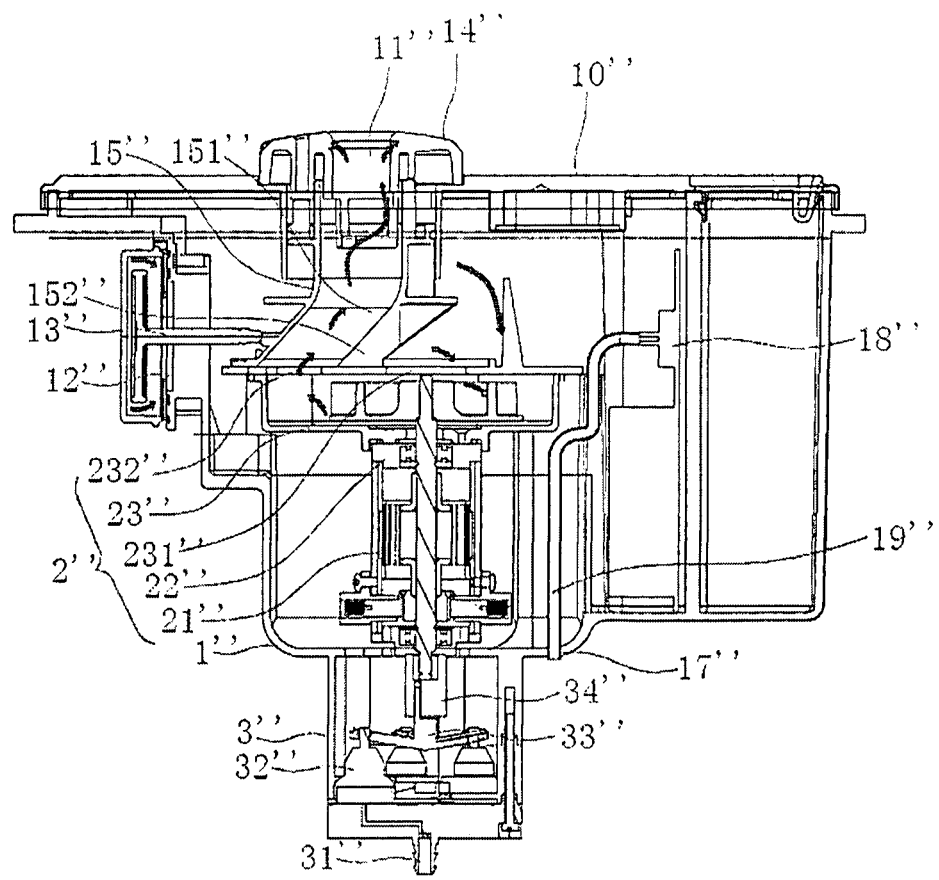
FIG. 19 is another cross-sectional view of the third air pump assembly of FIG. 16, wherein the third air pump assembly is shown in a deflation mode.

As shown in FIGS. 18 and 19, the air pump assembly A" also includes an air core 15" rotatably coupled to a hand wheel 14". It is also within the scope of the present disclosure that the air core 15" may be rotated automatically using the automatic operation mechanism 4 of FIGS. 3-8 or another suitable mechanism. The opening 11" may extend through the hand wheel 14". The air core 15" includes an internal passageway 151" in fluid communication with the opening 11" on one end (i.e., the top end in FIG. 18) and in selective fluid communication with the air pump 2" on the other end (i.e., the bottom end in FIG. 18). The illustrative internal passageway 151" has a horn shape and extends eccentric to a central axis of the air pump 2". The external surface of the air core 15" has an eccentric setting such that the air core 15" includes a cam 152" that is configured to selectively push the one-way valve 13" and open the vent 12".

The air pump 2' includes a body 23", a blade 22", and a motor 21" that drives the blade 22". The body 23" of the air pump 2' includes an air inlet 231" and an air outlet 232", wherein the air inlet 231" is arranged along the central axis of the blade 22" and the air outlet 232" is arranged tangent to the blade 22". In operation, the blade 22" draws air into the air inlet 231" and exhausts air through the air outlet 232".

Figure 16:
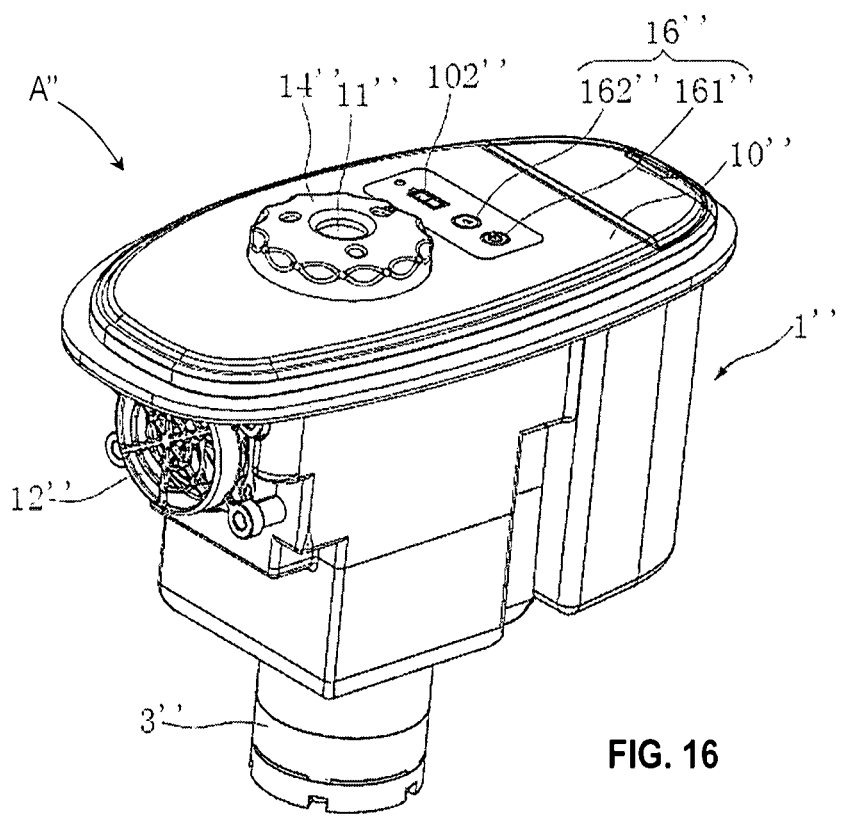
FIG. 16 is a perspective view of a third air pump assembly of the present disclosure.
Figure 17:
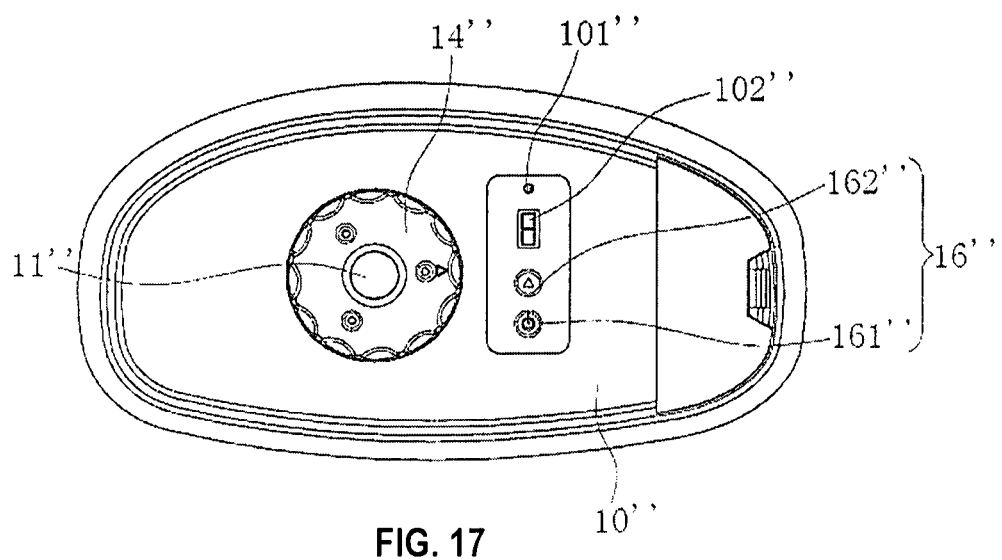
FIG. 17 is a top plan view of the third air pump assembly of FIG. 16.

The motor 21" of the air pump 2" is a two-speed motor having a high-speed rotary gear and a low-speed rotary gear. As shown in FIGS. 16 and 17, the motor 21" is controlled via a gear switch 16" that is located adjacent to the hand wheel 14" on the cover panel 10" of the housing 1" for access by the user. The gear switch 16" may have a high-speed state corresponding to a high-speed button 161", a low-speed state corresponding to a low-speed button 162", and an otherwise neutral state. It is also within the scope of the present disclosure that the gear switch 16" may be a 3-position rocker switch like gear switch 16' of FIGS. 9 and 10. When the gear switch 16" is in the neutral state, the motor 21" is turned off. When the gear switch 16" is in the high-speed state, the motor 21" operates in the high-speed gear. When the gear switch 16" is in the low-speed state, the motor 21" operates in the low-speed gear. In this embodiment, the motor 21", the pressure detector 18", the gear switch 16", and the power supply form an electrical circuit of the air pump assembly A".

The air pump assembly A" further includes a supplemental air admission system 3" located at the bottom of the housing 1" in FIGS. 18 and 19. The air admission system 3" includes an air admission hole 31" selectively sealed by an air admission valve 32", which is coupled to the motor 21" via a connecting rod 33" and a one-way bearing 34". The motor 21" may rotate the connecting rod 33" in a first direction in the high-speed gear and in an opposite, second direction in the low-speed gear. The connecting rod 33" may engage the one-way bearing 34" in the second direction such that the one-way bearing 34" allows the motor 21" to drive the air admission valve 32" in the low-speed gear without driving the air admission valve 32" in the high-speed gear.

The air pump assembly A" is configured to operate in an inflation mode, a deflation mode, and a pressure maintenance mode. The indicator light 101" may illuminate in one or more modes of operation whenever motor 21" is running. Each mode of operation is described further below.

The inflation mode is shown in FIG. 18. In this inflation mode, the user turns the hand wheel 14" to align the passageway 151" of the air core 15" with the air inlet 231" of the air pump 2". In this arrangement, the air inlet 231" of the air pump 2" communicates with the surrounding atmosphere via the passageway 151" and the opening 11", while the air outlet 232" of the air pump 2" communicates with the inflatable product via the vent 12". When the user presses the high-speed button 161" of the gear switch 16", the motor 21" of the air pump 2" begins to operate in the high-speed gear. The one-way valve 13" opens under the air pressure from the air pump 2" to allow air to enter and inflate the inflatable product via the open vent 12". When the user presses the high-speed button 161" of the gear switch 16" a second time, the motor 21" of the air pump 2" stops. When the motor 21" stops operating, the one-way valve 13" returns to its normally closed position to close the vent 12" and maintain the pressure of the inflatable product.

The deflation mode is shown in FIG. 19. In this deflation mode, the user turns the hand wheel 14" to align the passageway 151" of the air core 15" with the air outlet 232" of the air pump 2". In this arrangement, the air inlet 231" of the air pump 2" communicates with the inflatable product via the vent 12", while the air outlet 232" of the air pump 2" communicates with the surrounding atmosphere via the passageway 151" and the opening 11". At the same time, the cam 152" of the air core 15" contacts and forces the one-way valve 13" open. When the user presses the high-speed button 161" of the gear switch 16", the motor 21" of the air pump 2" begins to operate in the high-speed gear. With the motor 21" running, the air inlet 231" of the air pump 2" draws air out of and deflates the inflatable product via the open vent 12". When the user presses the high-speed button 161" of the gear switch 16" a second time, the motor 21" of the air pump 2" stops.

Figure 20:
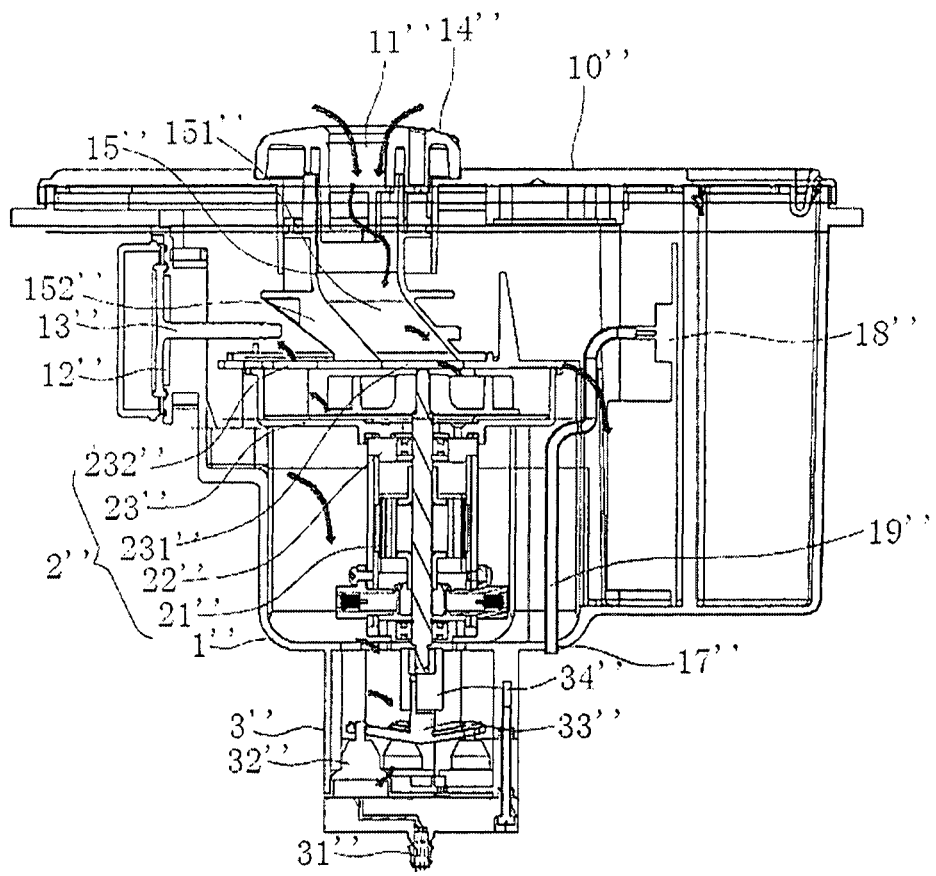
FIG. 20 is another cross-sectional view of the third air pump assembly of FIG. 16, wherein the third air pump assembly is shown in a pressure maintenance mode.

The pressure maintenance mode is shown in FIG. 20. In this maintenance mode, the user turns the hand wheel 14" to align the passageway 151" of the air core 15" with the air inlet 231" of the air pump 2", like the inflation mode of FIG. 18. When the user presses the low-speed button 162" of the gear switch 16", the pressure detector 18" begins operating. The pressure detector 18" may determine the pressure inside the inflatable product via the detection hole 17" and the tube 19". As long as the pressure inside the inflatable product is below a predetermined minimum set point, the pressure detector 18" may close the electrical circuit to the motor 21", and the motor 21" may begin operating the in the low-speed mode. The low-speed motor 21" opens the air admission valve 32" of the supplemental air admission system 3", which allows air to enter and inflate the inflatable product through the open admission hole 31". In this way, the supplemental air admission system 3" maintains the pressure of the inflatable product to ensure the inflatable product's normal use and comfort. The pressure detector 18" may open the electrical circuit and stop the motor 21" when the pressure inside the inflatable product reaches a predetermined maximum set point.

According to an exemplary embodiment of the present disclosure, the minimum and maximum pressure set points may be adjusted by the user, such as by pressing the low-speed button 162" of the gear switch 16" multiple times. Exemplary pressure set points are provided in Table 2 below, but these set points may vary to accommodate different inflatable products and user preferences.

TABLE 2

| Button (162") | Display (102") | Air Pump (2") | Admission System (3") | Min. Pressure (mm H$_2$O) | Max. Pressure (mm H$_2$O) |
|---|---|---|---|---|---|
| Press 1 time | 0 | Off | Closed | — | — |
| Press 2 times | 1 | Low-speed gear | Open | 180 | 200 |
| Press 3 times | 2 | Low-speed gear | Open | 200 | 220 |
| Press 4 times | 3 | Low-speed gear | Open | 230 | 250 |

Pressing the low-speed button 162" of the gear switch 16" another time may repeat the cycle set forth in Table 2 above.

The air pump assembly A" may be controlled remotely using the remote user input C, as discussed above with respect to FIGS. 1 and 2. For example, the user may press buttons on the remote user input C corresponding to the high-speed button 161" and the low-speed button 162" of the gear switch 16" on the air pump assembly A". The air pump assembly A" may also be controlled directly by pressing high-speed button 161" and the low-speed button 162" of the gear switch 16" on the air pump assembly A".

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multifunctional air pump comprising:
    an air pump assembly including a motor, the air pump assembly in fluid communication with an inflatable product and a surrounding atmosphere, wherein the air pump assembly is operable in:
        an inflation mode in which the air pump assembly inflates the inflatable product by operating the motor at a first speed and directing air from the surrounding atmosphere to the inflatable product;
        a deflation mode in which the air pump assembly deflates the inflatable product by operating the motor and directing air from the inflatable product to the surrounding atmosphere; and
        a maintenance mode in which the air pump assembly maintains inflation of the inflatable product by operating the motor at a second speed lower than the first speed and directing air from the surrounding atmosphere to the inflatable product; and
    a control module in electrical communication with the air pump assembly, the control module being configured to receive a user command and to operate the air pump assembly in one of the inflation, deflation, and maintenance modes based on the user command;
    a supplemental air admission system that is driven by the motor in the maintenance mode.

2. The multifunctional air pump of claim 1, wherein the control module communicates with at least one of a timer, a pressure detector, and a current detector in the maintenance mode.

3. The multifunctional air pump of claim 1, further comprising a connecting rod and a one-way bearing, wherein:
    in the first speed of the inflation mode, the motor operates in a first direction of rotation without driving the supplemental air admission system; and
    in the second speed of the maintenance mode, the motor operates in a second direction of rotation, and the one-way bearing engages the connecting rod to drive the supplemental air admission system.

4. The multifunctional air pump of claim 1, wherein the control module stops operating the air pump assembly in the maintenance mode when the inflatable product reaches a predetermined pressure.

5. The multifunctional air pump of claim 4, wherein the predetermined pressure is adjustable by a user.

6. The multifunctional air pump of claim 4, wherein the control module resumes operating the air pump assembly in the maintenance mode when a predetermined time has expired.

7. The multifunctional air pump of claim 4, further comprising a current detector that determines the pressure of the inflatable product by measuring the current of the motor.

8. The multifunctional air pump of claim 4, further comprising a pressure detector that determines the pressure of the inflatable product via a tube in fluid communication with the inflatable product.

9. The multifunctional air pump of claim 1, further comprising:
    a blade that is driven by the motor in the inflation and deflation modes.

10. The multifunctional air pump of claim 9, further comprising an air passageway in fluid communication with the surrounding atmosphere, wherein:
    in the inflation and maintenance modes, the air passageway is aligned with an air inlet to the blade; and
    in the deflation mode, the air passageway is aligned with an air outlet from the blade.

11. The multifunctional air pump of claim 10, further comprising a vent in fluid communication with the inflatable product, the vent having a check valve that is biased closed, wherein:
    in the inflation mode, the check valve opens under air pressure from the blade; and
    in the deflation mode, the check valve opens through contact with a cam coupled to the air passageway.

12. A multifunctional air pump in fluid communication with an inflatable product and operable in an inflation mode, a deflation mode, and a maintenance mode, the multifunctional air pump comprising:
    a motor;
    an air pump driven by the motor in the inflation mode to inflate the inflatable product and in the deflation mode to deflate the inflatable product; and
    a supplemental air admission system driven by the motor in the maintenance mode to maintain inflation of the inflatable product.

13. The multifunctional air pump of claim 12, further comprising a control module configured to receive a user command and to operate the multifunctional air pump in one of the inflation, deflation, and maintenance modes based on the user command.

14. The multifunctional air pump of claim 12, wherein:
in the inflation mode, the motor operates at a first speed; and
in the maintenance mode, the motor operates at a second speed lower than the first speed.

15. The multifunctional air pump of claim 12, further comprising:
a vent in fluid communication with the inflatable product and the air pump; and
an air admission hole in fluid communication with the inflatable product and the supplemental air admission system.

16. The multifunctional air pump of claim 12, wherein:
the air pump includes a blade; and
the supplemental air admission system includes an air admission valve.

17. The multifunctional air pump of claim 12, wherein:
in the inflation mode, the motor operates in a first direction of rotation; and
in the maintenance mode, the motor operates in a second direction of rotation.

18. The multifunctional air pump of claim 17, further comprising a one-way bearing that engages a connecting rod to drive the supplemental air admission system in the maintenance mode without driving the supplemental air admission system in the inflation mode.

19. A multifunctional air pump in fluid communication with an inflatable product, the multifunctional air pump comprising:
a motor;
an air pump coupled to the motor; and
a supplemental air admission system coupled to the motor;
wherein the multifunctional air pump is operable in:
an inflation mode in which the motor drives the air pump to inflate the inflatable product;
a deflation mode in which the motor drives the air pump to deflate the inflatable product; and
a maintenance mode in which the motor drives the supplemental air admission system to maintain inflation of the inflatable product.

20. The multifunctional air pump of claim 19, wherein:
in the inflation mode, the motor operates at a first speed; and
in the maintenance mode, the motor operates at a second speed lower than the first speed.

21. The multifunctional air pump of claim 19, wherein:
in the inflation mode, the motor operates in a first direction of rotation; and
in the maintenance mode, the motor operates in a second direction of rotation.

22. The multifunctional air pump of claim 19, further comprising a one-way bearing that engages a connecting rod to drive the supplemental air admission system in the maintenance mode without driving the supplemental air admission system in the inflation mode.

* * * * *

UNITED STATES PATENT AND TRADEMARK OFFICE
CERTIFICATE OF CORRECTION

Page 1 of 1

PATENT NO.       : 10,851,795 B2
APPLICATION NO.  : 15/768436
DATED            : December 1, 2020
INVENTOR(S)      : Hua Hsiang Lin et al.

It is certified that error appears in the above-identified patent and that said Letters Patent is hereby corrected as shown below:

On the Title Page

Column 1, under Foreign Application Priority Data item (30), the foreign priority reference numbers are incomplete. Please amend Line 1 to read "201520799262.9" and Line 2 to read "201520898479.5".

On page 2, Column 1, under Foreign Application Priority Data item (30), the foreign priority reference numbers are incomplete. Please amend Line 1 to read "201520959301.7", Line 2 to read "201620247404.5", Line 4 to read "201620452516.4", Line 5 to read "201620452544.6", Line 6 to read "201620452545.0," and Line 7 to read "201620452597.8".

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*